Sept. 8, 1953 H. L. BLYDENBURGH 2,651,530
DRIVE CONNECTION
Filed Feb. 21, 1950
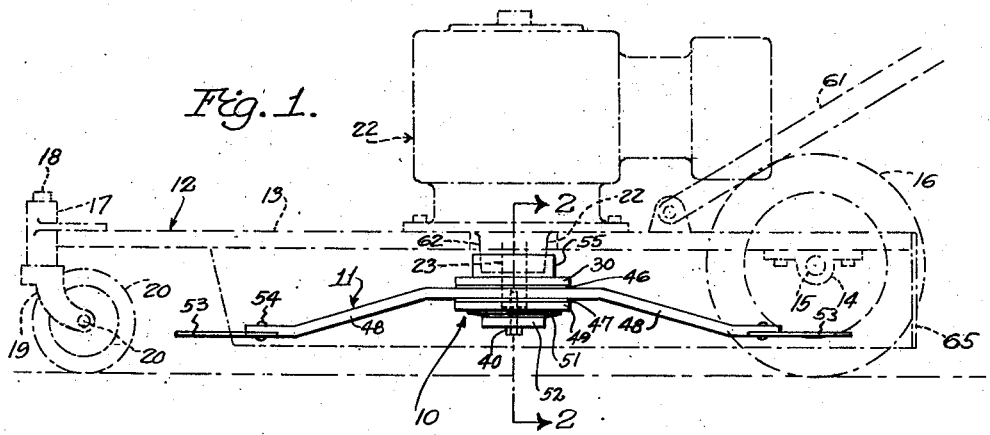
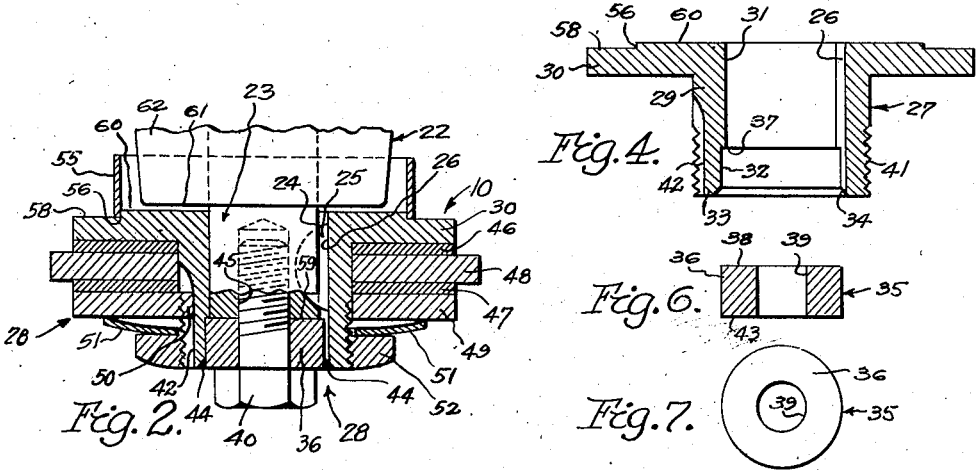
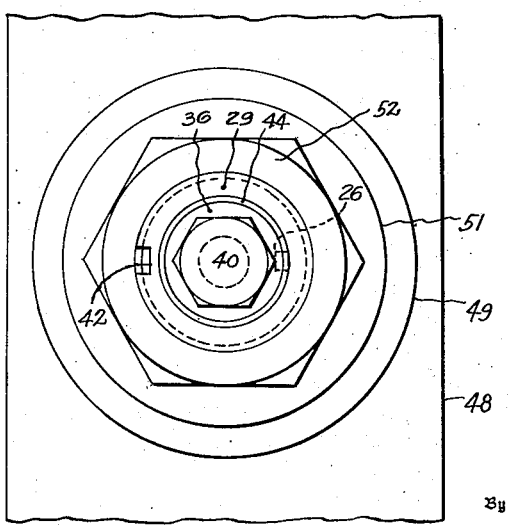
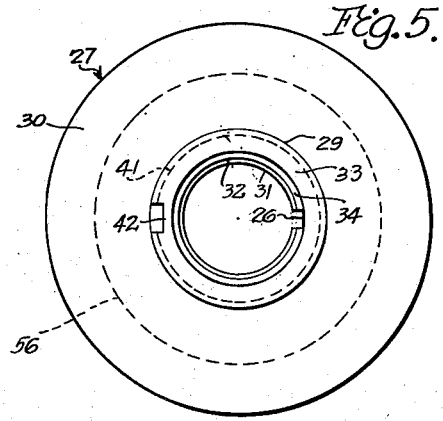
Inventor
Harold L. Blydenburgh
Barthel & Bugbee
Attorneys Patented Sept. 8, 1953

2,651,530

UNITED STATES PATENT OFFICE 2,651,530

DRIVE CONNECTION

Harold L. Blydenburgh, Detroit, Mich., assignor to The Moto-Mower Company, Detroit, Mich., a corporation of Michigan Application February 21, 1950, Serial No. 145,463

1 Claim. (Cl. 287—53)

This invention relates to machine elements and, in particular, to drive connections interposed between a rotary shaft and a rotary member such as a fan, propeller, pulley, cutter blade or the like.

One object of this invention is to provide a drive connection and process of making the same, for drivingly attaching a rotary member to a shaft, such as a motor shaft, whereby expensive machining operations are simplified and replaced by simpler welding operations.

Another object is to provide a drive connection and process of the foregoing character which maintains a predetermined clearance between the stationary portion of the motor and the rotary member, so that all danger of binding or rubbing is eliminated.

Another object is to provide a yieldable drive connection of the foregoing character wherein the hub of the drive connection carries friction members which frictionally engage the rotary driven member and transmit power thereto so long as the rotary member does not encounter resistance or load greater than a predetermined amount which will cause the connection to slip.

In the drawings:

Figure 1 is a side elevation of a drive connection for a rotary member, according to one form of the invention, shown as applied to a power lawnmower indicated in dotted lines;

Figure 2 is an enlarged central vertical section through the drive connection shown in Figure 1, taken along the line 2—2 therein;

Figure 3 is a bottom plan view of the drive connection and rotary member portion shown in Figure 2;

Figure 4 is a central vertical section through one part of the hub unit of the drive connection shown in Figures 1 to 3 inclusive;

Figure 5 is a bottom plan view of the hub part shown in Figure 4;

Figure 6 is a central vertical section through an annular plug element adapted to be welded or otherwise secured in the collar element shown in Figure 4; and Figure 7 is a bottom plan view of the annular plug shown in Figure 6.

Referring to the drawings in detail, Figure 1 shows a slipping drive connection, generally designated 10, according to the invention as applied to the drive of a rotary member 11, such as the rotary cutter of a power lawnmower, generally designated 12. The power lawnmower 12 itself is conventional and its details are beyond the scope of the present invention. For the purpose of illustrating the present invention, the power lawnmower 12 may be said to consist of a support or chassis 13 to the rearward end of which are secured pillow blocks 14 in which is journaled an axle 15 carrying ground wheels 16 spaced apart from one another a sufficient distance to permit freedom of action of the rotary cutter 11. Vertical swivel bearings 17 are secured to the forward end of the chassis 13 and these carry vertical pivot shafts 18 on the lower end of which are mounted yokes or forks 19 carrying axles 20 which rotatably support wheels 21. Bolted or otherwise secured to the chassis 13 is a motor, generally designated 22, such as an internal combustion engine having a vertical output shaft 23. It will be understood, however, that the invention is not limited to a vertical shaft but may equally well be employed on a horizontal shaft or on a vertical shaft which is connected to a reduction gear box, gearing or the like, or to a motor with a horizontal output shaft.

The motor shaft 23 is provided with a power-transmitting portion such as a key seat 24 adapted to receive a key 25 of a conventional type, for example, a Woodruff key, and this key drivingly engages a keyway 26 formed in the major part 27 of a hub unit, generally designated 28 and shown complete in Figures 2 and 3. The major hub portion 27 is in the form of a collar 29 having an annular flange 30 extending transversely therefrom and has a bore 31 through both the collar 29 and flange 30. The bore 31 at one side is provided with the keyway 26 in the form of a longitudinal groove extending from one end to the other of the bore 31. A slightly enlarged counterbore 32 extends inward from the free end 33 of the collar portion 29 and is flared as at 34 to facilitate the insertion of a closure member in the form of an annular plug 35 as well as to provide space for welding metal, as described below. The plug 35 is in the form of a ring having an outer surface 36 of approximately the same diameter as the counterbore 32 with sufficient clearance to permit its insertion, the annular shoulder 37 between the bore 31 and counterbore 32 serving as a stop for the upper end 38 of the plug 35. A bore 39 is formed through the center of the plug 35 for the insertion of a fastener, such as the cap screw 40 shown in Figures 2 and 3. The plug 35 is of approximately the same thickness as the depth of the counterbore 32. The collar portion 29 of the hub part 27 is provided with an externally threaded portion 41 and is also slotted longitudinally as at 42.

The hub unit 28 is assembled by inserting the plug 35 in the counterbore 32 so that its lower end 43 is substantially flush with the lower end 33 of the hub part 27, and is then welded in position as at 44 (Figure 2). The hub unit 28 is then ready for application to the lower end of the motor shaft 23 which is provided with a threaded bore 45 adapted to receive the threaded portion of the cap screw or other fastener 40.

The hub unit 28 forms the central portion of the slipping drive connection 10 which additionally includes a pair of friction washers 46 and 47 mounted on opposite sides of a cutter bar 48 and having a washer 49 mounted beneath them (Figure 2), the washer 49 having a tooth 50 adapted to enter the slot 42. In this manner, the washer 49 is caused to rotate as a unit with the hub unit 28. The washers 46, 47 and 49 and the cutter bar 48 are bored to approximately the same diameter as the collar portion 29 so as to slide thereon and be held in position by a spring washer 51 and lock nut 52, the latter being threaded upon the threaded portion 41 of the hub unit 28. The cutter bar 48 has cutter blades 53 secured as at 54 to its opposite ends (Figure 1). A skirt 55 is mounted on and secured as by welding to an annular shoulder 56 on the flange portion 57 of the hub part 27, this being provided with an annular recessed surface 58 for that purpose. It will be obvious that multiple grooves or slots 26, such as an internal spline, may be formed in the bore 31, rather than the single keyway 26 shown in Figures 4 and 5.

In the operation of the invention, let it be assumed that the parts have been assembled in the foregoing manner, as shown in Figures 1 to 3 inclusive. When the fastener 40 is tightened and drawn upward to its innermost position in the threaded bore 45, the plug portion 35 of the hub unit 28 is drawn tightly against the lower end 59 of the shaft 23. In this manner, the upper surface 60 of the hub unit 28 is prevented from engaging the lower end 61 of the casing 62 of the motor 22 (Figure 2) and a sufficient clearance is set up therebetween to prevent rubbing. The motor is started, causing the rotary member 11 to rotate, moving the cutter blades 53 through a circular path. The operator pushes the machine 12 forward by means of the usual handle 61, so that the cutter blades 53 cut the grass. A guard or skirt 65 attached to the chassis 13 and surrounding the cutter 11 prevents injury to the operator and also prevents the cut grass or leaves from flying outward.

If, however, an obstruction is encountered which offers greater resistance than the motor 12 can safely handle, the cutter bar 48 halts by reason of the slipping frictional connection between it and the friction washers 46 and 47. The motor shaft 23, however, can continue rotating safely without breakage until the motor 22 is either stopped or the lawnmower 12 retracted so as to remove the obstruction. The cupped washer 51 is of resilient material and applies a constant pressure to the washer 49 from the threaded lock nut 52, thereby creating the frictional slipping connection described above.

What I claim is:

A hub unit for holding a motor-driven rotary element comprising a hollow cylindrical tubular member having an abutment flange adjacent one end thereof and an externally-screw-threaded portion on the opposite end thereof, said tubular member having an outer cylindrical rotary-element-receiving surface and an inner cylindrical motor-shaft-receiving bore coaxial therewith and having a longitudinally-disposed drive-transmitting groove therein, said tubular member also having a counterbore of larger diameter than said bore coaxial with and opening into said bore from the threaded end thereof, said cylindrical outer surface of said tubular member having a rotary element drive-transmitting portion thereon, and an annular closure member snugly secured in said counterbore and united fixedly and permanently to said tubular member against relative motion therebetween, said closure member having a central fastener-receiving hole therethrough coaxial with said bore and counterbore.

HAROLD L. BLYDENBURGH.

References Cited in the file of this patent

UNITED STATES PATENTS

| Number | Name | Date |
|---|---|---|
| 396,642 | Ball | Jan. 22, 1889 |
| 634,256 | Atherton | Oct. 3, 1899 |
| 1,004,203 | Ross | Sept. 26, 1911 |
| 1,039,125 | Hardy | Sept. 24, 1912 |
| 1,288,136 | Neuteboom | Dec. 17, 1918 |
| 1,434,433 | Ettinger | Nov. 7, 1922 |
| 1,834,125 | Goldberg | Dec. 1, 1931 |
| 2,360,488 | Garnab | Oct. 17, 1944 |
| 2,407,239 | Albrecht | Sept. 10, 1946 |
| 2,419,849 | Morris | Apr. 29, 1947 |
| 2,452,458 | Hahn | Oct. 26, 1948 |